US012732552B2

(12) United States Patent
Selitser

(10) Patent No.: US 12,732,552 B2
(45) Date of Patent: Sep. 8, 2026

(54) SYSTEM AND METHOD FOR MANAGING TIME BETWEEN PARTICIPANTS OF AN ELECTRONIC MEETING

(71) Applicant: RingCentral, Inc., Belmont, CA (US)

(72) Inventor: Ilia Selitser, Belmont, CA (US)

(73) Assignee: RingCentral, Inc., Belmont, CA (US)

( * ) Notice: Subject to any disclaimer, the term of this patent is extended or adjusted under 35 U.S.C. 154(b) by 146 days.

(21) Appl. No.: 18/620,701

(22) Filed: Mar. 28, 2024

(65) Prior Publication Data

US 2025/0310389 A1 Oct. 2, 2025

(51) Int. Cl.

| | |
|---|---|
| ***H04L 65/4038*** | (2022.01) |
| ***G06F 11/34*** | (2006.01) |
| ***G06V 40/16*** | (2022.01) |
| ***G10L 17/00*** | (2013.01) |

(52) U.S. Cl.

CPC ...... *H04L 65/4038* (2013.01); *G06F 11/3438* (2013.01); *G06V 40/173* (2022.01); *G10L 17/00* (2013.01)

(58) Field of Classification Search

CPC . H04L 65/4038; H04L 65/403; H04L 67/535; H04L 12/1822; H04L 12/1818; H04L 12/1827; G06V 40/173; G06F 11/3438; G10L 17/00

See application file for complete search history.

(56) References Cited

U.S. PATENT DOCUMENTS

| | | | | |
|---|---|---|---|---|
| 7,007,235 | B1 * | 2/2006 | Hussein | G06Q 10/10 715/753 |
| 10,587,553 | B1 * | 3/2020 | Ghafourifar | H04L 65/403 |
| 11,212,129 | B1 * | 12/2021 | Sipcic | H04L 47/522 |
| 12,015,653 | B1 * | 6/2024 | Desai | H04L 65/403 |
| 2010/0291528 | A1 * | 11/2010 | Huerta | G09B 7/00 434/362 |
| 2010/0318399 | A1 * | 12/2010 | Li | G06Q 10/1093 715/753 |
| 2013/0315108 | A1 * | 11/2013 | Lindner | H04L 65/4046 455/518 |
| 2015/0304381 | A1 * | 10/2015 | Rosansky | H04L 65/1069 370/259 |
| 2016/0048274 | A1 * | 2/2016 | Rosenberg | G06F 3/04847 715/753 |
| 2016/0234268 | A1 * | 8/2016 | Ouyang | H04L 67/54 |
| 2017/0302466 | A1 * | 10/2017 | Stoner | H04L 12/1822 |
| 2020/0279567 | A1 * | 9/2020 | Adlersberg | G06F 40/35 |
| 2020/0320478 | A1 * | 10/2020 | Crawford | H04L 65/1066 |
| 2020/0372475 | A1 * | 11/2020 | Bastide | G06Q 10/06312 |
| 2021/0260489 | A1 * | 8/2021 | Cruz | H04L 67/131 |
| 2022/0191257 | A1 * | 6/2022 | Aceron | G06F 3/04842 |
| 2023/0208979 | A1 * | 6/2023 | Harris | G06V 40/176 348/14.03 |
| 2024/0097925 | A1 * | 3/2024 | Palamadai | H04N 7/152 |
| 2024/0153397 | A1 * | 5/2024 | Ji | G06V 40/176 |
| 2024/0333864 | A1 * | 10/2024 | Peterson | H04N 7/147 |
| 2025/0260770 | A1 * | 8/2025 | Hassan | H04N 7/157 |

* cited by examiner

*Primary Examiner* — Madhu Woolcock

(57) ABSTRACT

A method includes monitoring accesses to a plurality of data shared with a plurality of online users that form an online group, wherein the plurality of data is shared over a plurality of times. The method further includes determining statistical information associated with accesses to the plurality of data by the plurality of online users. The method also includes displaying the statistical information in a graphical user interface (GUI).

22 Claims, 14 Drawing Sheets

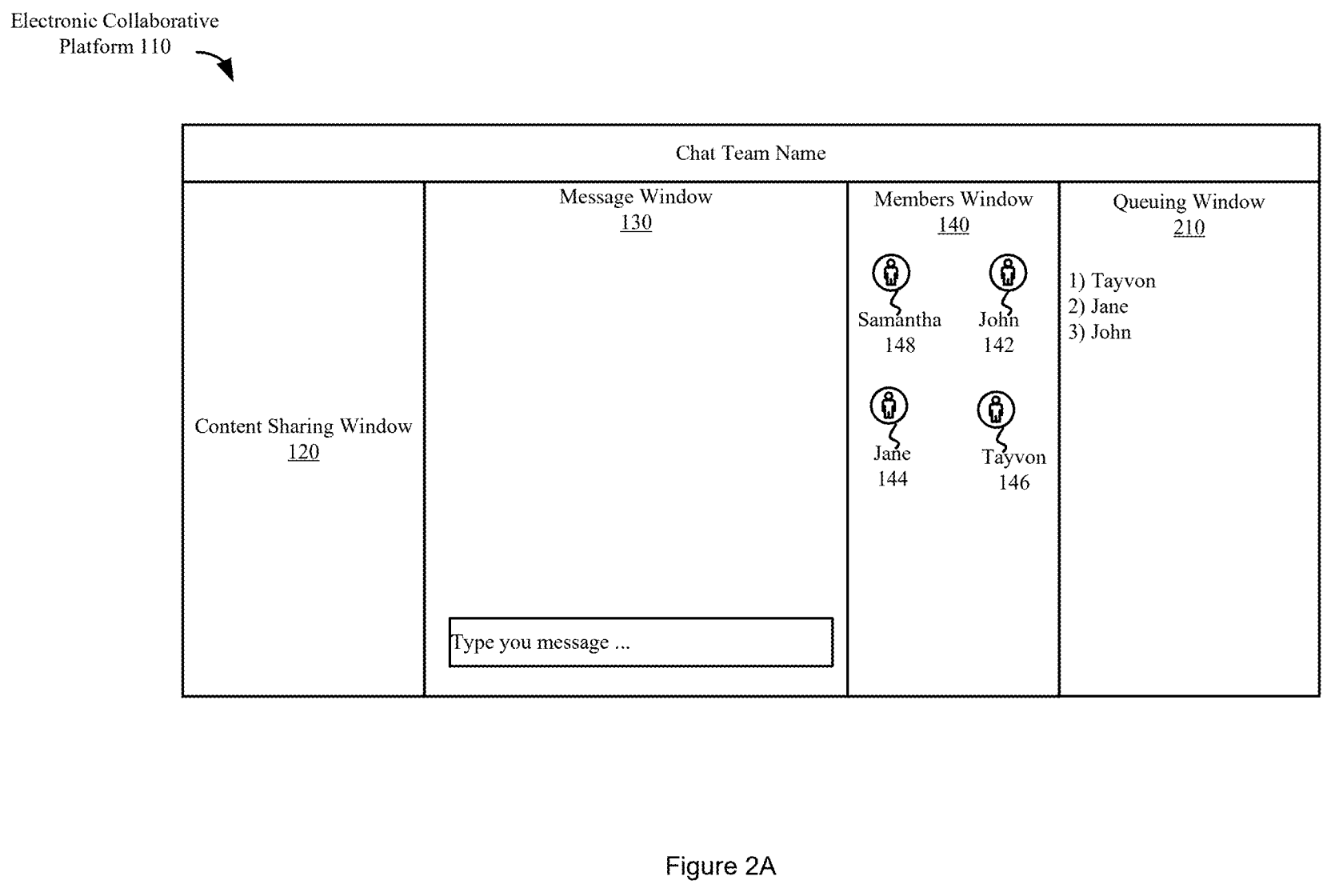

Electronic Collaborative Platform 110

Chat Team Name

Content Sharing Window
120

Message Window
130

Type you message ...

Members Window
140

Samantha
148

John
142

Jane
144

Tayvon
146

Queuing Window
210

1) Tayvon
2) Jane
3) John

Figure 2A

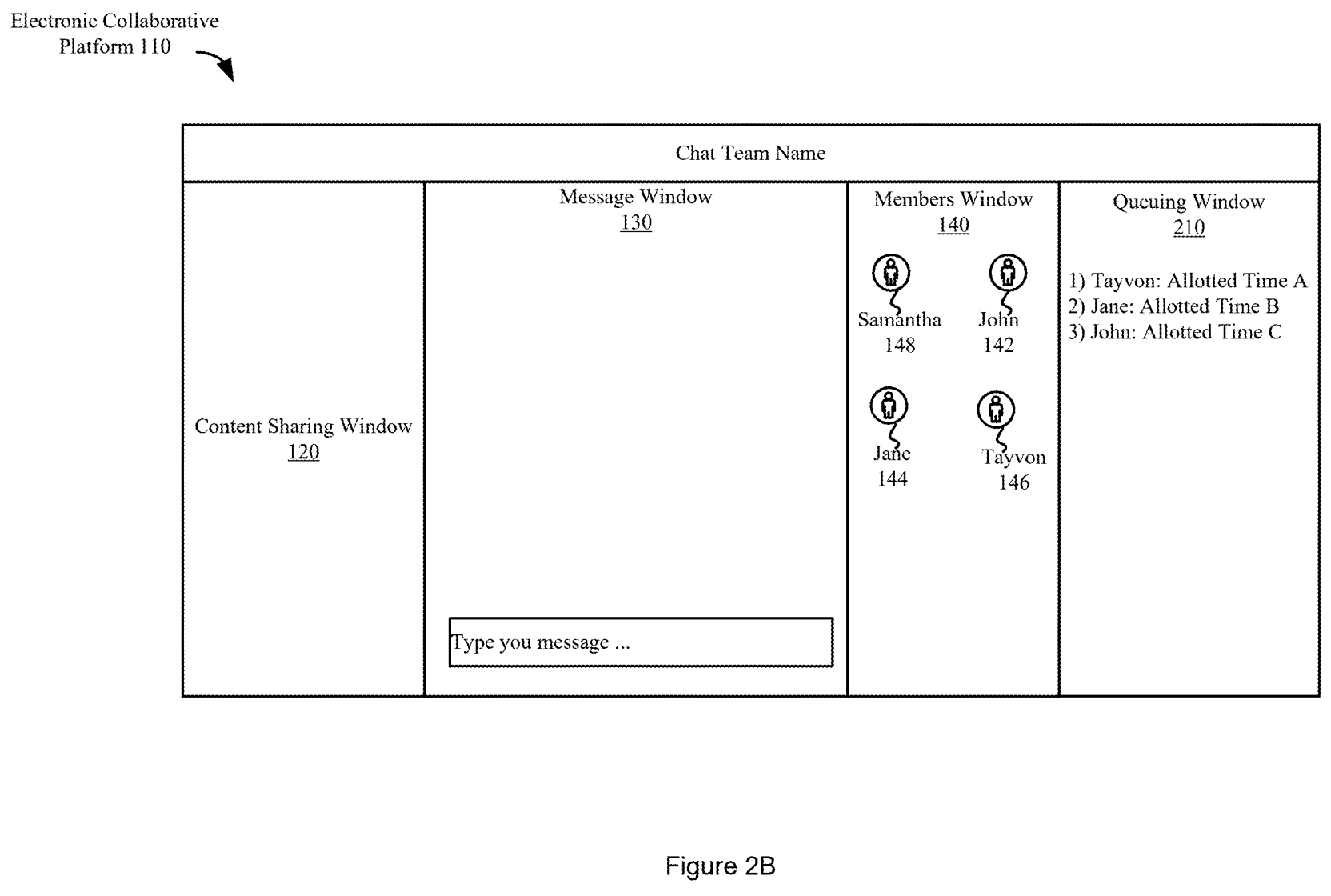

Electronic Collaborative Platform 110

Chat Team Name

Content Sharing Window 120

Message Window 130

Type you message ...

Members Window 140

Samantha 148

John 142

Jane 144

Tayvon 146

Queuing Window 210

1) Tayvon: Allotted Time A
2) Jane: Allotted Time B
3) John: Allotted Time C

Figure 2B

Figure 3B:
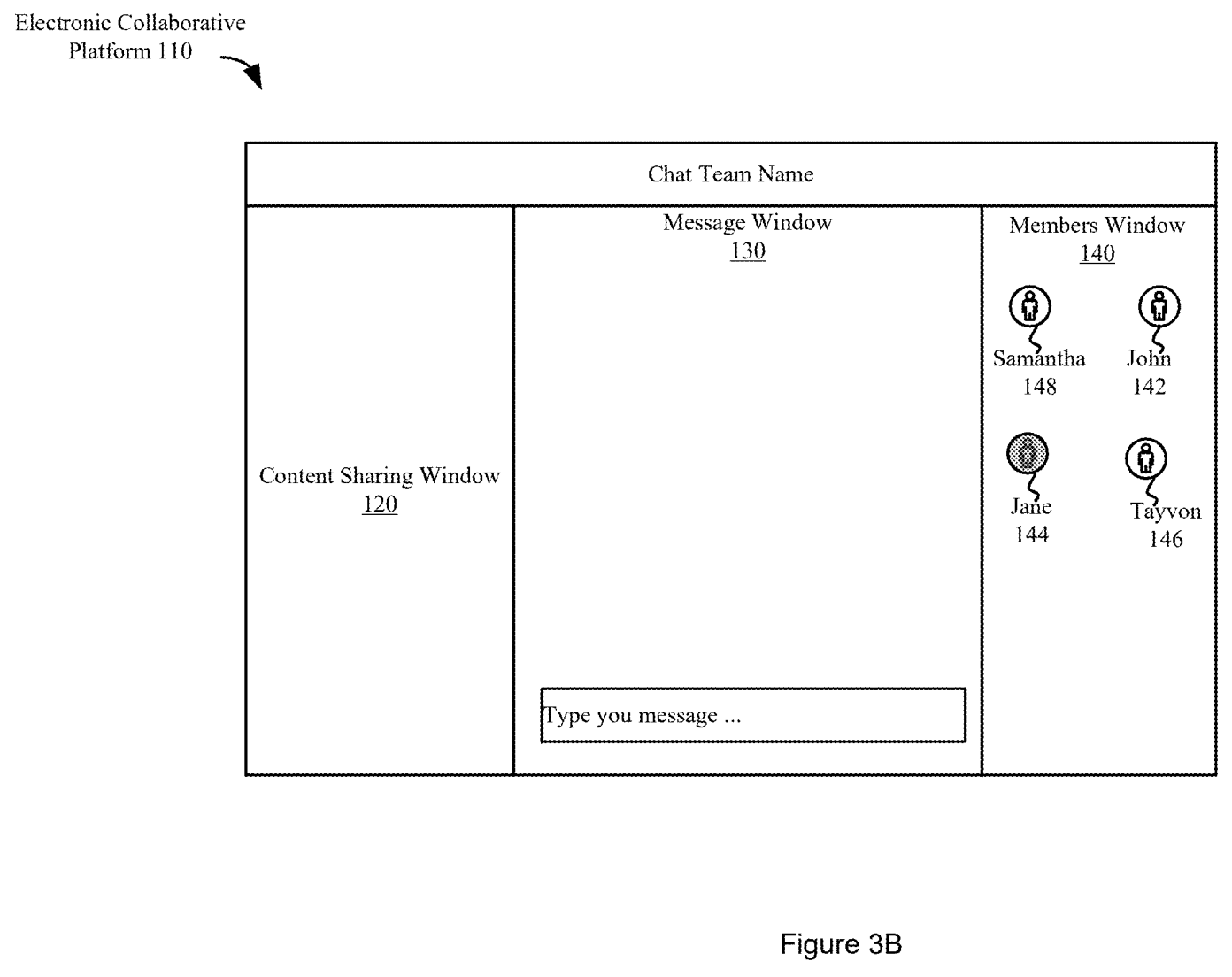

Electronic Collaborative Platform 110

Chat Team Name

Content Sharing Window 120

Message Window 130

Type you message ...

Members Window 140

Samantha 148

John 142

Jane 144

Tayyon 146

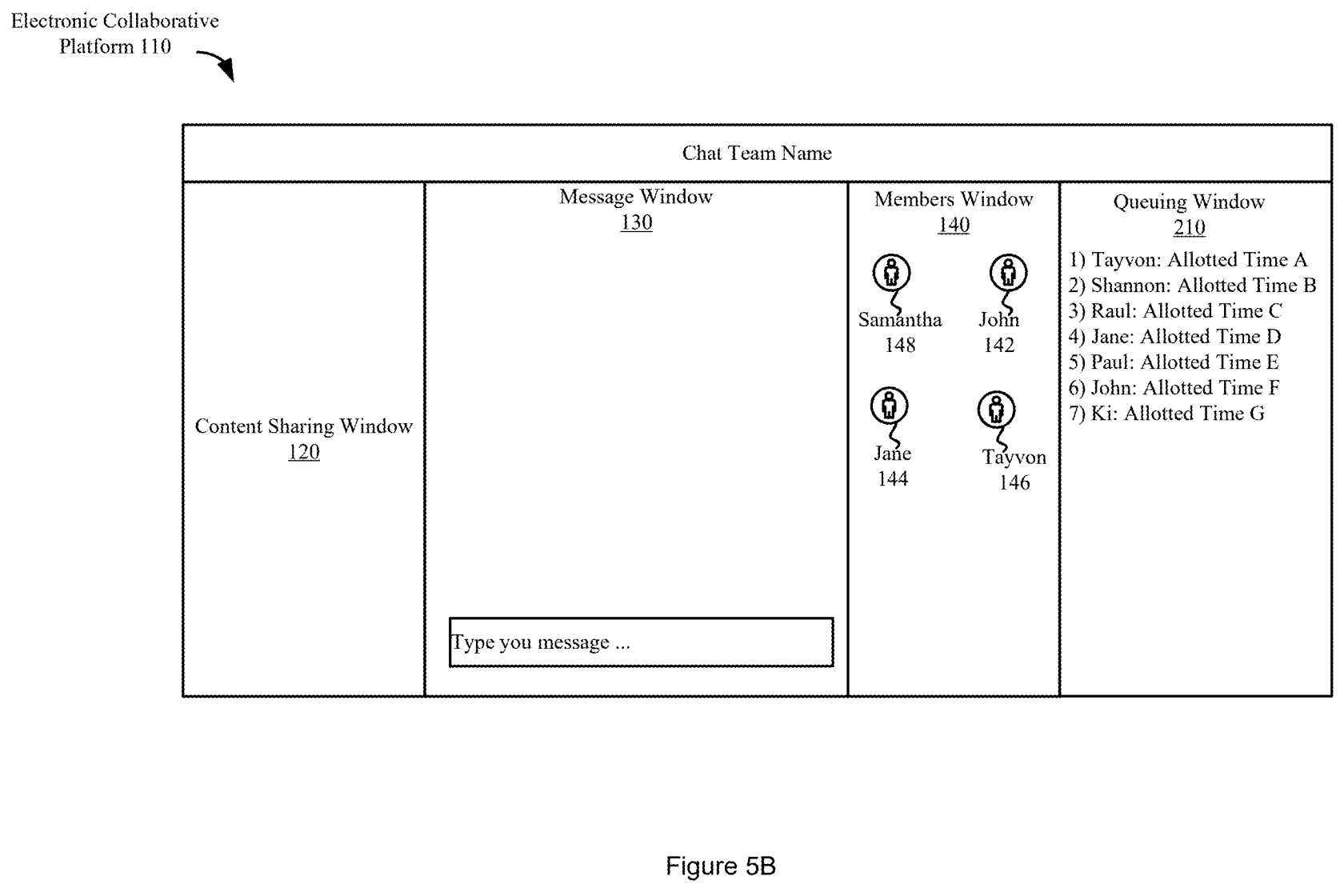

Electronic Collaborative Platform 110

Chat Team Name

Content Sharing Window 120

Message Window 130

Type you message ...

Members Window 140

Samantha 148

John 142

Jane 144

Tayyon 146

Queuing Window 210

1) Tayyon: Allotted Time A
2) Shannon: Allotted Time B
3) Raul: Allotted Time C
4) Jane: Allotted Time D
5) Paul: Allotted Time E
6) John: Allotted Time F
7) Ki: Allotted Time G

Figure 5B

SYSTEM AND METHOD FOR MANAGING TIME BETWEEN PARTICIPANTS OF AN ELECTRONIC MEETING

BACKGROUND

Recent advancements in technology and in particular online technology have led to an increased use of online forums for collaboration purposes. For example, many employees are now working at least partially from home and attend online meetings and collaborate online. In one nonlimiting example, a user of a chat communication service may create an online chat group/team for conducting online collaboration environment (e.g., chat, share files, share audio/video, etc.) with other team members. Often times an online meeting is conducted by one speaker or presenter while other users may participate by interacting with one another or the speaker throughout the online meeting. It is difficult to moderate a meeting to allow users to participate equitably. For example, it is often at the discretion of the presenter which questions to answer and the chronological ordering of the questions which he or she may want to address. Unfortunately, relying on the speaker's discretion on which questions to answer and the chronological ordering of the questions that may be answered may result in a handful of users (a participant in the audience) monopolizing the meeting time and depriving other users from participating in the meeting adequately. As yet another nonlimiting example, in a seminar/webinar setting, one member of the audience may monopolize the meeting time and runout the clock by asking a long-winded question that may take a long time to answer, thereby depriving other members of the audience from participating in the seminar and to get their questions answered.

SUMMARY

Accordingly, a need has arisen to equitably distribute a meeting time (managing time) among participants of an online meeting.

In some embodiments, a method for managing time between participants of an electronic meeting in an electronic collaborative platform includes electronically monitoring activity of each participant of a plurality of participants in an electronic meeting. The activity occurs during the electronic meeting within the electronic collaborative platform, e.g., Microsoft Teams® account, RingCentral® account, Slack® account, Zoom® account, etc., and/or outside of the electronic collaborative platform. The method may further include determining an activity time within the electronic meeting that is associated with activity for each participant of the plurality of participants. According to some embodiments, the method further includes determining positioning of the each participant of the plurality of participants in an electronic queue based on the activity of time for the each participant of the plurality of participants. In some nonlimiting examples, an allotted time is associated to the each participant of the plurality of participants based on the activity time for the each participant of the plurality of participants. It is appreciated that the plurality of participants is queued in the electronic queue based on the positioning of the each participant of the plurality of participants. The electronic queue is associated with chronological ordering and the allotted time of the plurality of participants to participate in the electronic meeting. In some embodiments, participation in the electronic meeting is controlled based on the electronic queue.

In some embodiments, a system for allotting time to meeting participants and queue management for the meeting participants in an electronic collaborative platform includes a processor, a camera, a microphone, and a memory. The camera is configured to capture images associated with participants of an electronic meeting. The microphone is configured to capture audio associated with participants of the electronic meeting. The memory stores a set of instructions, that when executed by the processor, causes receiving images from the camera or receiving audio from the microphone. The images or the audio are associated with a first plurality of participants of the electronic meeting that join the electronic meeting using a single account. The set of instructions further causes electronically monitoring a first activity of each participant of the first plurality of participants of the electronic meeting, wherein the first activity occurs during the electronic meeting. The set of instructions also causes electronically monitoring a second activity of each participant of a second plurality of participants in the electronic meeting, wherein the second activity occurs during the electronic meeting within the electronic collaborative platform. In some embodiments, the set of instructions further causes determining a first activity time within the electronic meeting that is associated with the first activity for each participant of the first plurality of participants. In one nonlimiting example, the set of instructions further causes determining a second activity time within the electronic meeting that is associated with the second activity for each participant of the second plurality of participants. In some embodiments, the set of instructions further causes determining positioning of the each participant of the first and the second plurality of participants in an electronic queue based on the first and the second activity times for the each participant of the first and the second plurality of participants. It is appreciated that an allotted time is associated to the each participant of the first and the second plurality of participants based on the first and the second activity times. Moreover, participants of the first and the second plurality of participants are queued in the electronic queue based on the positioning of the each participant of the first and the second plurality of participants, wherein the electronic queue is associated with chronological ordering and the allotted time of the first and the second plurality of participants to participate in the electronic meeting. Furthermore, participation in the electronic meeting is controlled based on the electronic queue.

These and other features and aspects of the concepts described herein may be better understood with reference to the following drawings, description, and appended claims.

BRIEF DESCRIPTION OF DRAWINGS

FIGS. 2A-2B is a diagram showing an example of queuing users according to some embodiments.

FIGS. 3A-3C is a diagram showing an example of managing time and positioning of users according to some embodiments.

FIGS. 5A-5B is a diagram showing an example of queuing users in FIGS. 4A and 4B according to some embodiments.

DETAILED DESCRIPTION

Figure 1A:
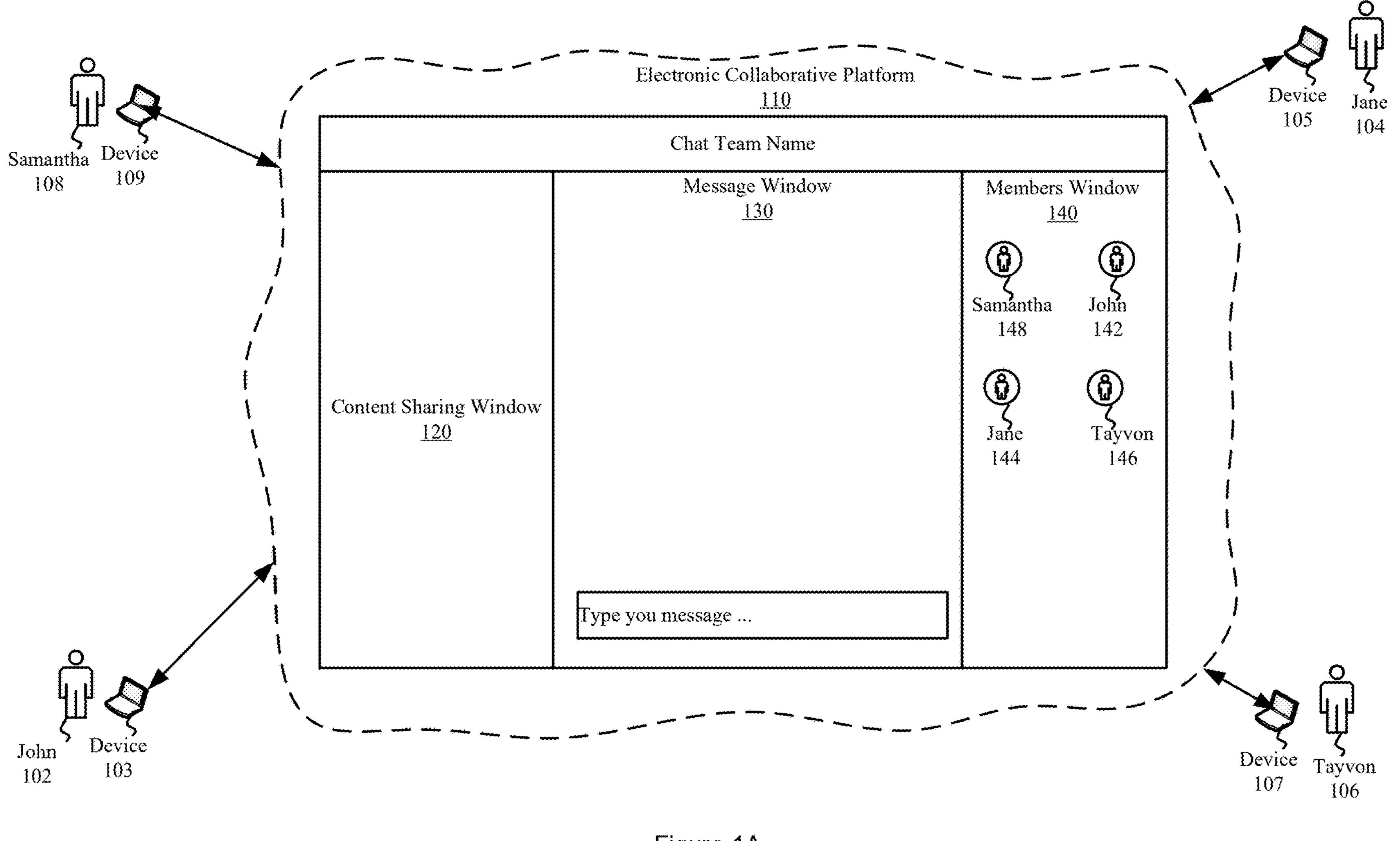
FIG. 1A is a diagram showing an example of an online collaborative environment where activity of the users within the online collaborative environment is monitored according to some embodiments.

The example embodiments described herein are directed to a communication system. The communication system is configured to facilitate communication between online users. Communication may be through an online forum, e.g., online group, online team, webinar, chat team, etc. The communication system may also facilitate communication between users via telephony and/or video conferencing, etc.

The communication system such as online collaborative system provides an environment that is configured to facilitate data exchanges, e.g., audio data, video data, content data (e.g., PowerPoint®, Word®, PDF, etc.), messaging (e.g., instant messaging), etc., amongst users. It is appreciated that the term "user(s)" generally refers to participants of a communication session whether as host or invitee(s) or team member(s). It is also appreciated that the term "user" is used interchangeably with "member" or "participant" throughout the application.

A host or an administrator or any online user may create an online group/team using the communication system. For example, a user may create an online group or team via a chat function of the communication system or via a calendar associated with the online collaborative environment. As another example, a user may create an online group for a webinar using the communication system. It is appreciated that the term "group" or "team" has been used interchangeably throughout the application.

Once an online team has been created (online collaborative environment e.g., Microsoft Teams® account, RingCentral® account, Slack® account, Zoom® account, etc., that may include various applications such as a chat application, video conferencing, audio application, etc.), one or more members of the team can share electronic data/content with other users (i.e. team members) and communicate with one another. For example, a team member (whether the host or presenter or another team member) may present (speak) material as well as post content to share with other team members or users such as online communication, e.g., messaging, video chat, audio chat, etc. The online collaborative environment is used to control and manage time for the online meeting. For example, the questions or comments from users of the online collaborative environment may be positioned in a queue based on various factors, e.g., activities (such as sharing a picture, sharing a document, sharing a video, sharing an audio file, emailing, conducting a telephone calls, texting, etc.) occurred during the online meeting that occurs within the online collaborative platform, activities (such as sharing a picture, sharing a document, sharing a video, sharing an audio file, emailing, conducting a telephone calls, texting, etc.) occurred during the online meeting that occurs outside the online collaborative platform, etc., to be addressed by the presenter.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "rendering," "utilizing," "launching," "calling," "starting," "accessing," "sending," "conferencing," "triggering," "ending," "suspending," "terminating," "monitoring," "displaying," "removing," "performing," "preventing," "hiding," "blocking," "tracking," "associating," "queuing," "controlling," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1A is a diagram showing an example of an online collaborative environment where activity of the users within the online collaborative environment is monitored according to some embodiments. In some nonlimiting examples, the online collaborative environment may include an electronic collaborative platform 110 (a system that may facilitate a video conferencing, an audio conferencing, a webinar, etc.). The electronic collaborative platform 110 may be Microsoft Teams® account, RingCentral® account, Slack® account, Zoom® account, etc. In one nonlimiting example, the electronic collaborative platform 110 communicatively connects the users/participants of a meeting, e.g., group/team. Accordingly, the electronic collaborative platform 110 may facilitate a chat, a video conference, an audio call, a webinar, file sharing, etc., among the team members. Content exchanged between the group members may include audio data, video data, file (e.g., PowerPoint®, Word®, PDF, etc.), messaging (e.g., instant messaging), etc.

In this nonlimiting example, the electronic collaborative platform 110 enables one or more users to create a team/group. For example, Samantha 108, as a host or administrator or speaker, may have a device 109 associated therewith, e.g., smartphone, laptop, desktop, etc., that can be used to create a team/group in the electronic collaborative platform 110 using a graphical user interface (GUI). Samantha 108 in this example may create a group/team, e.g., chat team, webinar meeting, etc., and select the users John 102, Jane 104, and Tayvon 106 as users or participants of a given team/group being created. The selection of the users may be based on their membership to a particular organization, team, project, etc. In one nonlimiting example, Samatha 108 may instantiate a contact button to select the users from a rendered list. Samatha 108 may create the group/team and provide the chat team name. Once the group/team is created, then the users, e.g., Samantha 108, John 102, Jane 104, and Tayvon 106 may communicate and exchange data using their respective devices 109, 103, 105, and 107. It is appreciated that the number of users and the manner by which the team/group is created is for illustrative purposes only and should not be construed as limiting the scope of the embodiments.

In one nonlimiting example, the electronic collaborative platform 110 facilitates rendition of content being shared in the content sharing window 120 for the created group/team. For example, the users within the team/group may share content that is being rendered in the content sharing window 120, e.g., picture, audio, video, file, text, etc. Moreover, messages may be exchanged among the users in the message window 130. In one nonlimiting example, the users (name), e.g., Samantha 148, John 142, Jane 144, and Tayvon 146, may be rendered in a members window 140. It is appreciated that the users of the created group/team may share content publicly with other users within the same group/team or privately. For example, John 142 may message every user, e.g., Samantha 148, Jane 144, and Tayvon 146, within the created group/team or John 142 may privately message Samantha 148 and Jane 144. It is appreciated that in some embodiments, the created group/team may be for a scheduled amount of time, e.g., given date/time range such as a meeting for an hour on a given day.

According to some embodiments, activities associated with one or more users of the created team/group may be monitored. For example, activities of users, e.g., John 102, Jane 104, Tayvon 106, and Samantha 108, may be monitored as Samantha 108 is speaking or presenting to John 102, Jane 104, and Tayvon 106. Activities of the users may include messaging, video chat, video sharing, audio chat, audio sharing, content such as file/document (e.g., picture, text file, etc.) sharing, calling/receiving phone calls, asking questions, answering questions, electronic mail (e-mail), mobile texting, etc. It is appreciated that monitored activities may include interactions between the users, e.g., interactions and activities between John 102 and Jane 104.

According to some embodiments, activity time associated with the monitored activities is determined. For example, an activity time associated with messaging may be the amount of time that it may take to draft a message to be shared with one or more users may be determined. In yet another example, an activity time associated with a video content may be duration of the video. In yet another example, the activity time associated with a question may be the duration of time it may take to ask a question and in some examples the activity time associated with answering a question may be the amount of time it may take to answer a question. It is appreciated that in some embodiments, the activity time may be predicted, e.g., estimate of the amount of time it may take to answer a given question, as opposed to actual measured time, e.g., the amount of time a user may be on the phone. In some nonlimiting examples, a certain amount of time may be given to each word for estimation purposes, e.g., 0.2 second for each word being written. In some nonlimiting examples, an activity time associated with a shared document may be based on the size of the file. Activity time associated with a given activity is determined, regardless of the manner in which activity time is determined.

Figure 1B:
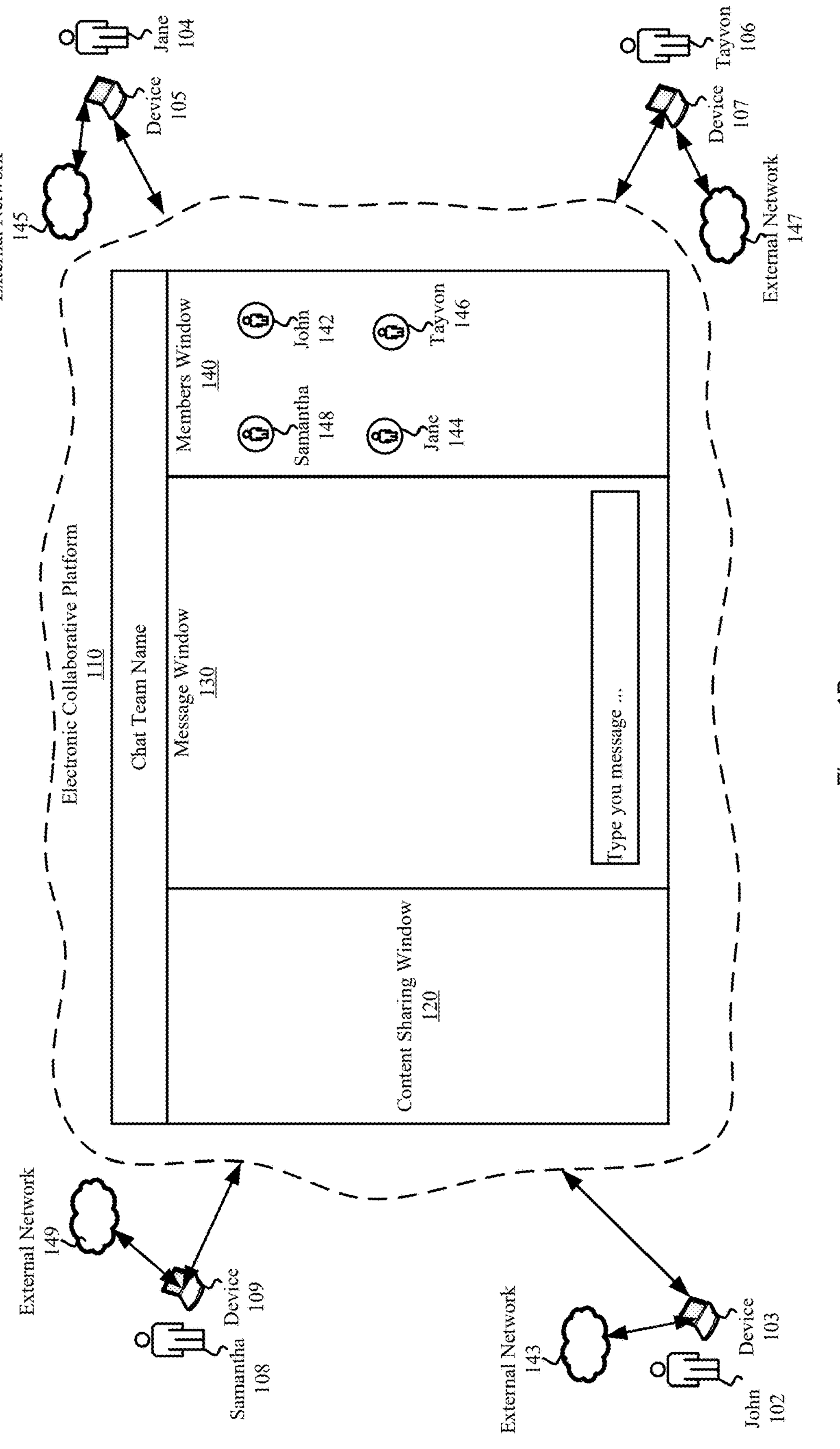
FIG. 1B is a diagram showing an example of an online collaborative environment where activity of the users outside of the online collaborative environment is monitored according to some embodiments.

It is appreciated that activities may occur within the electronic collaborative platform 110 and/or it may be within a different platform. For example, certain activities, e.g., messaging, video chat, audio chat, sharing content, phone call, questions being asked from the speaker or from other users and answering the questions being asked, etc., may be within the electronic collaborative platform 110 while other activities, e.g., phone call, text message, etc., may occur outside of the electronic collaborative platform 110, e.g., different platform. It is appreciated that activities that occur outside of the electronic collaborative platform 110 may be referred to as external activities. For example, FIG. 1B shows monitoring activity of each user that are external to the electronic collaborative platform 110 via external networks 149, 143, 145, and 147 for users Samanta 108, John 102, Jane 104, and Tayvon 106 respectively.

It is appreciated that in some embodiments, the activities may be activities that occur within the created group/team during the time which the meeting occurs (e.g., during a given date/time that the meeting was scheduled for the meeting between John 102, Jane 104, Tayvon 106, and Samantha 108) and/or it may include activities outside of a created group/team but still within the same electronic collaborative platform 110 during the time which the meeting occurs (e.g., during a given date/time that the meeting was scheduled for the meeting between John 102, Jane 104, Tayvon 106, and Samantha 108). For example, activities may include activities of John 102, Jane 104, Tayvon 106, and Samantha 108 within the group/team that was created for them. In some examples, the activities may include activities of John 102, Jane 104, Tayvon 106, and Samantha 108 outside of the group/team, e.g., activity of Tayvon 106 interacting with a user in a different group/team within the electronic collaborative platform 110, e.g., other than Samantha 108, Jane 104, and John 102. It is appreciated that in some nonlimiting examples, the members of the created team/group may overlap with members of another team/group.

It is appreciated that activity time may be weighted differently based on whether they occur within the electronic collaborative platform 110 or outside of the electronic collaborative platform 110. In yet another example, the activity time may be weighted differently based on whether they occur within the same group/team of the electronic collaborative platform 110 or within a different group/team of the electronic collaborative platform 110.

Referring now to FIGS. 2A-2B, an example of queuing users according to some embodiments is shown. It is appreciated that the electronic collaborative platform 110 may determine the positioning of each user, e.g., questions being presented by users, in an electronic queue based on the activity time and/or the duration of the meeting. For example, the electronic collaborative platform 110 may determine the position of each user, e.g., John 102, Jane 104, Tayvon 106, Samantha 108, within the group/team may be determined in an electronic queue based on the activity of time for each user. For example, in one nonlimiting example, the electronic collaborative platform 110 may determine that the meeting between Samantha 108, John 102, Jane 104, and Tayvon 106 is scheduled for an hour and that the speaker, Samantha 108 in this case, is scheduled to present for 30 minutes leaving 30 minutes for participation by other users. The electronic collaborative platform 110 may determine the activity time associated with Jane 104 to be 5 minutes whereas activity time associated with John 102 is determined to be 8 minutes and Tayvon 106 to be 1 minute. The electronic collaborative platform 110 may determine that there are pending questions, e.g., in the message window 130 from all users of the group/team such as Tayvon 106, John 102, and Jane 104. The electronic collaborative platform 110 may reposition the chronological ordering of the questions or reposition the users in the queuing window 210 based on activity time. In this example, the electronic collaborative platform 110 may determine that Tayvon 106 has not participated as much as other users John 102 and Jane 104 and that it would be equitable to allow Tayvon 106 to have priority over the other users even though the question received from Tayvon 106 may be subsequent to receiving the questions from John 102 and Jane 104. As such, Tayvon 106 may be placed in the first position of the queue. Other users may similarly be positioned in an electronic queue. In contrast, in one nonlimiting example, Tayvon 106 may be placed in the last position in the queue if it is determined that Tayvon 106 has been chatting with another person (e.g., external activity).

It is appreciated that in some nonlimiting examples, the electronic collaborative platform 110 may further base the positioning of the users, in the electronic queue, on chronological order of activities associated with the users, e.g., order at which questions are being asked, order of activity such as text message by John 102 at time to and sharing of video clip by Jane 104 at time ti subsequent to time to, etc. For example, certain types of activities, e.g., sharing video, may be given a higher weight in comparison to other types of activities when determining the positioning of the users in the electronic queue. In yet another example, the electronic collaborative platform 110 may further base the positioning of the users, in the electronic queue, on a ratio of the activity time for a question being asked to predicted activity time associated with the answer (e.g., length of the time it will take for an answer), etc. In one nonlimiting example, the smaller the ratio the longer it will take to answer the question and therefore the question may be considered as long (or a long-answer question) and deprioritized and vice versa. It is appreciated that other types of ratios for activities and activity time may be considered in a similar fashion that the ratio of question to answer has been used in determining the positioning of the users in the electronic queue. In yet another nonlimiting example, the electronic collaborative platform 110 may further base the positioning of the users, in the electronic queue, based on recency of a particular activity type, e.g., question, answer, message, sharing content, etc. For example, the electronic collaborative platform 110 may base the positioning within the electronic queue on how recent a particular activity type has been for a given user, e.g., how recent comment/question from Tayvon 106 is in comparison to John's 102.

It is appreciated that in some examples, the positioning of the users in the electronic queue may be rendered in the queuing window 210, as shown in FIG. 2A. In one nonlimiting example, the electronic collaborative platform 110 may also determine the allotted time to each user and associate the allotted time to each user as positioned in the electronic queue. For example, the electronic collaborative platform 110 may determine that Tayvon 106 is allotted 3 minutes as opposed to John 102 who is allotted 1 minute. In one nonlimiting example, the allotted time for each user may also be rendered in the queuing window 210, as shown in FIG. 2B.

It is appreciated that in some embodiments, instead of rendering the positioning of the users (as shown in FIGS. 2A-2B), the electronic questions that are submitted by the users are automatically repositioned and then presented according to the positioning in the electronic queue. For example, in this example since Tayvon 106 is number one in the electronic queue followed by Jane 104 and John 102, then the questions as submitted, e.g., through the message window 130, may be repositioned to display question by Tayvon 106 first followed by questions by Jane 104 and John 102 respectively. In yet another example, the presented questions may be positioned (reconfigured for rendering) based on the position of the users in the electronic queue in addition to rendering the positioning of the users in the queuing window 210. It is appreciated that the electronic collaborative platform 110 continues determining activities and activity time and continues to dynamically adjust the positioning of the users within the electronic queue.

Accordingly, the electronic collaborative platform 110 is configured to manage time and control participation in the group/team in a particular order (positioning based on the position within the electronic queue). It is appreciated that the electronic collaborative platform 110 enables certain activities that were completely ignored in the conventional system to be used in determining positioning of the users within an electronic queue. For example, the electronic collaborative platform 110 has enabled measurements of activities within the electronic collaborative platform 110 to be used in determining the positioning of the users. Moreover, other types of monitoring and platforms have been leveraged to determine activity and activity time outside of the electronic collaborative platform 110 that were previously being ignored in determining the positioning of the users within the electronic queue. In fact, monitoring activities of users whether within the electronic collaborative platform 110 or outside of the electronic collaborative platform 110 were previously not possible (e.g., messaging, emailing, sharing content, etc.) and feasible because human intervention could not have successfully obtained the activities, activity time, etc., sufficiently. Furthermore, the electronic collaborative platform 110 has enabled the meeting to be conducted more efficiently to address questions/comments that are deemed as more valuable (higher priority) in comparison to other questions/comments that are deemed as less valuable, thereby increasing efficiency when conducting an online meeting to facilitate online collaboration.

Figure 3A:
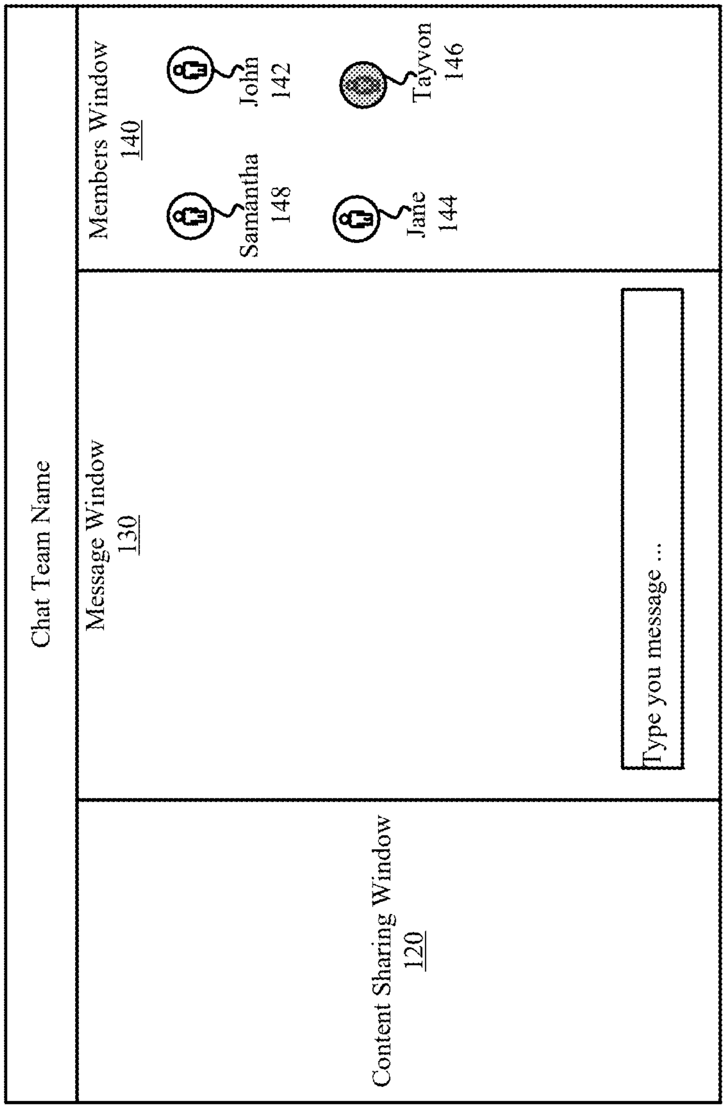
Figure 3A:
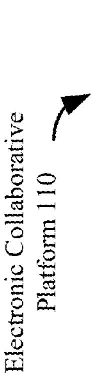
Figure 3C:
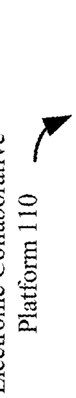
Figure 3C:
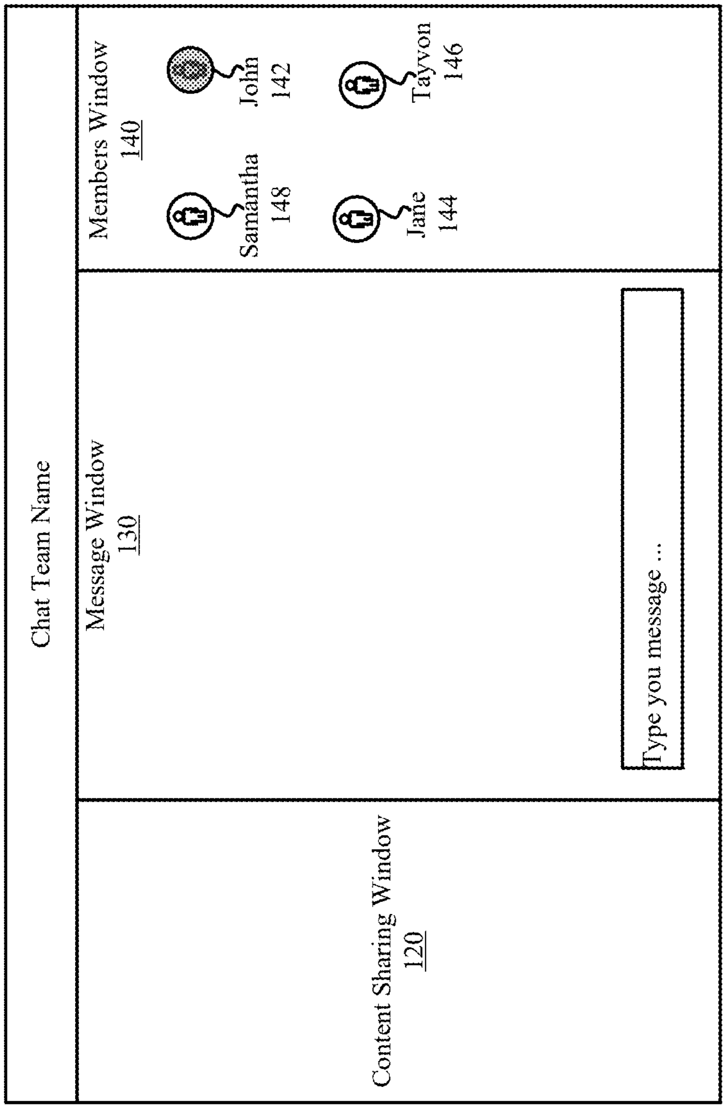

Referring now to FIGS. 3A-3C, an example of managing time and positioning of users according to some embodiments is shown. In one nonlimiting example, the positioning of the users within the electronic queue may be illustrated by activating the user that takes priority over other users. In this example, Tayvon 146 is activated, as shown in FIG. 3A, to show that Tayvon 146 takes priority over other users (e.g., first position in the electronic queue). Referring now to FIG. 3B, Jane 144 is activated subsequent to Tayvon 146 asking question/comment to show that Jane 144 is now in the first position of the electronic queue. Similarly, in FIG. 3C, John 142 is activated to reflect his position as number in the electronic queue in comparison to the other users in the electronic collaborative platform 110. It is appreciated that FIGS. 3A-3C are shown for illustration purposes and should not be construed as limiting the scope of the embodiments. For example, other methods of identifying the positioning of the users within the electronic queue may be used.

Figure 4A:
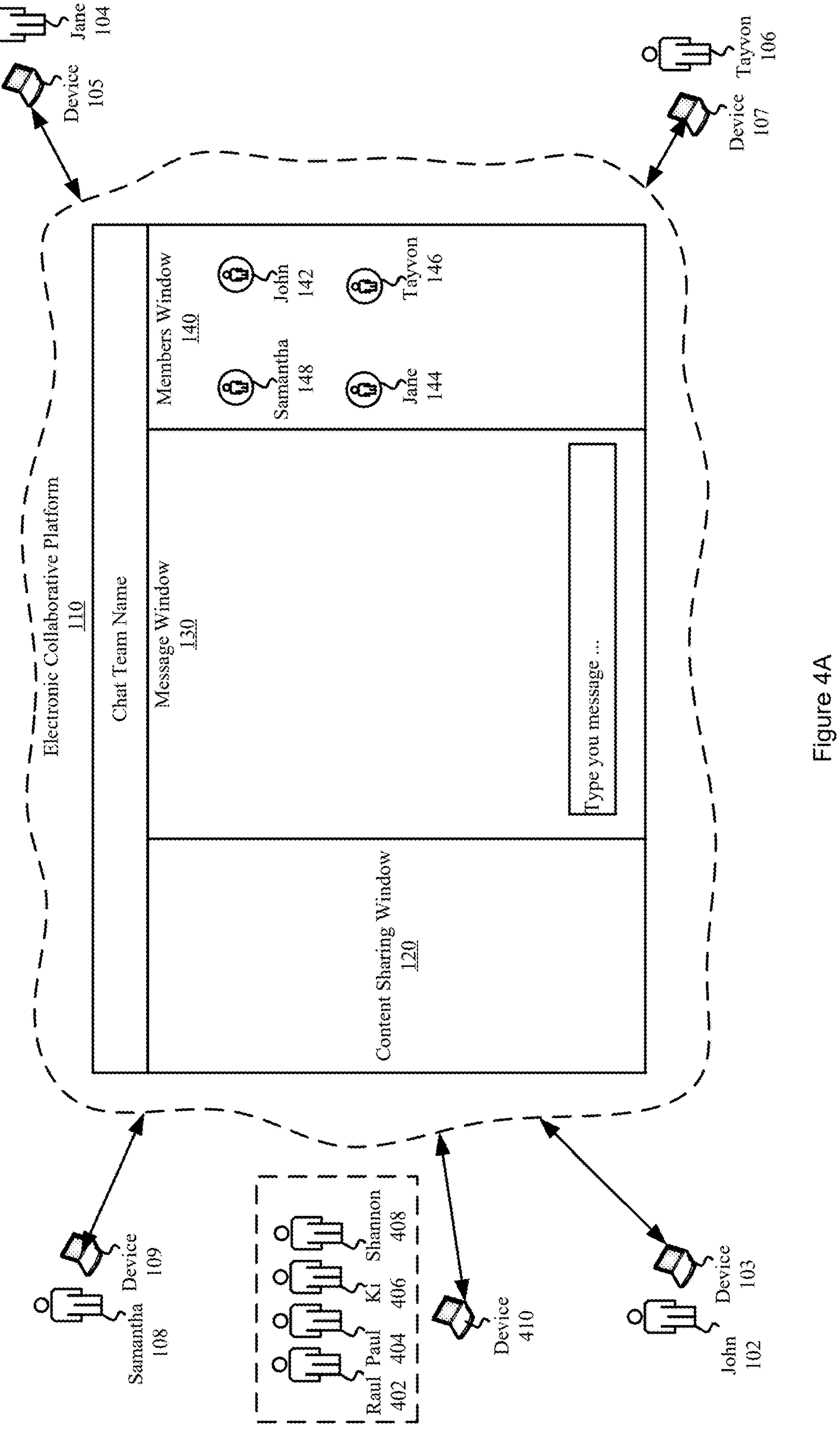
FIG. 4A is a diagram showing an example of an online collaborative environment including multiple users attending the online collaborative environment using one account where activity of the users within the online collaborative environment is monitored according to some embodiments.

Referring now to FIG. 4A, an example of an online collaborative environment including multiple users attending the online collaborative environment using one account where activity of the users within the online collaborative environment is monitored according to some embodiments is shown. FIG. 4A is similar to that of FIG. 1A in addition to having multiple users joining the group/team using a single account, e.g., multiple users joining the group/team meeting using a conference room using a single conference room account. In this nonlimiting example, users Raul 402, Paul 404, Ki 406, and Shannon 408 have also been added to the group/team and join the meeting using a device 410 (device in a conference room associated with a single account) to join the meeting. It is appreciated that activities of the users 402-408 may be monitored similar to that of users 102, 104, 106, and 108. For example, activities of users 402-408 via the device 410 with the electronic collaborative platform 110 may be monitored similar to that described in FIG. 1A. Image processing may be performed to distinguish among users 402-408 and further to attribute activities to the correct user based on the image processing. In some embodiments, voice recognition may be used to distinguish between users, e.g., to distinguish Raul 402 from Paul 404. In one nonlimiting example, interaction such as conversation between Raul 402 and Shannon 408 may be monitored using image processing to determine the activity in addition to the activity time, as described above. In other words, using image processing and/or voice recognition activities outside of the bound of electronic devices, e.g., conversation, gesture, etc., may be captured to identify activity and activity time. Once activities, e.g., interaction within the electronic collaborative platform 110 as described in FIG. 1A or interactions outside the electronic collaborative platform 110 such as conversation between two users or gesture among users such as raising hand, etc., are determined their respective activity time may be determined, as described above. As such, positioning of the users within the electronic queue is determined similar to that of FIG. 2A as described above.

Figure 4B:
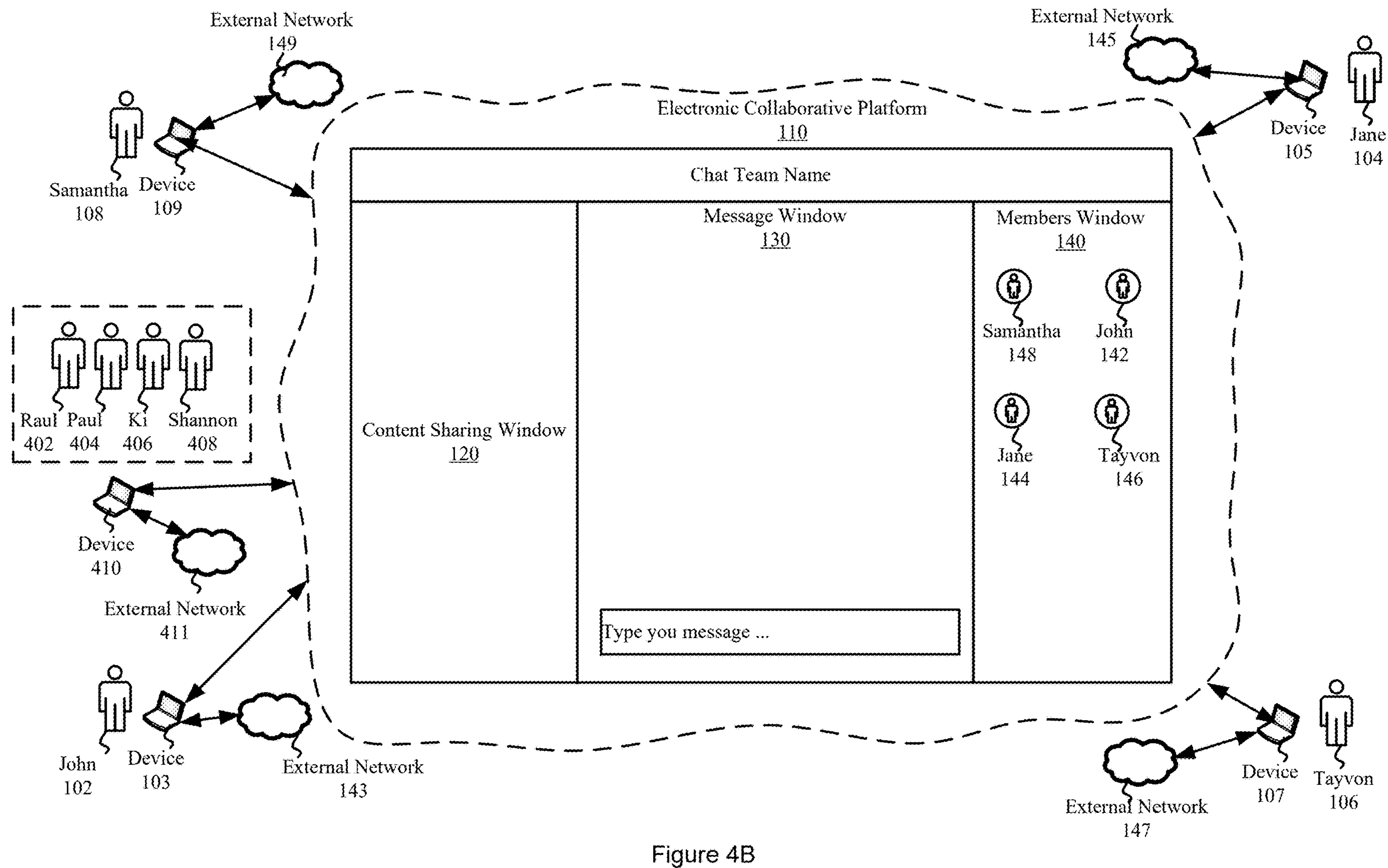
FIG. 4B is a diagram showing an example of an online collaborative environment including multiple users attending the online collaborative environment using one account where activity of the users outside of the online collaborative environment is monitored according to some embodiments.

Referring now to FIG. 4B, an example similar to FIG. 4A is shown except that external activities of the users similar to that of FIG. 1B are also monitored. For example, activities of the users 402-408 that are external to the electronic collaborative platform 110 may be monitored. For example, interaction of users 402-408 via device 410 through an external network 411, outside of the electronic collaborative platform 110 is monitored, e.g., with another electronic collaborative platform. It is appreciated that since the users 402-408 join the meeting/group using a single account users' activities using their respective devices (not shown here) may also monitored in addition to their exchanges using device 410. For example, Paul's 404 use of smartphone may be monitored where his smartphone may be different from device 410. In some embodiments, the device 410 may include a camera to capture one or more images associated with users 402-408. It is appreciated that the monitored activities may be used to determine activity time, as described above with respect to FIG. 2B. As such, the electronic collaborative platform 110 may position the users within the electronic queue as described above even though a subset of users joins the group/team using a single account, e.g., via device 410. It is appreciated that the allotted time for each user may be determined similar to that described in FIGS. 2A-2B.

Figure 5A:
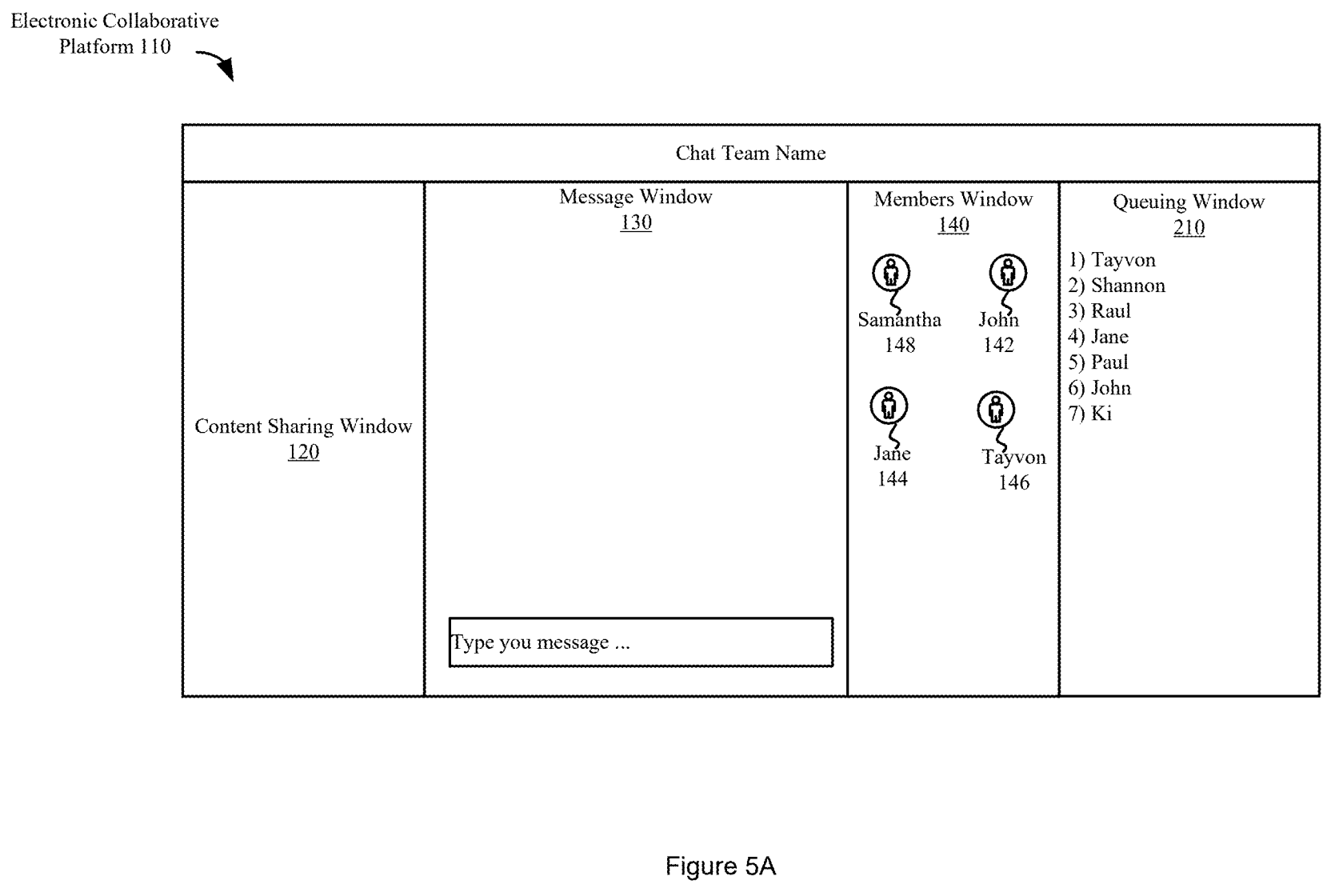

Referring now to FIGS. 5A-5B, an example of queuing users in FIGS. 4A and 4B according to some embodiments is shown. FIG. 5A shows the positioning of the users of FIGS. 4A and 4B in an electronic queue whereas FIG. 5B shows the positioning of the users in addition to their respective allotted time.

Figure 6:
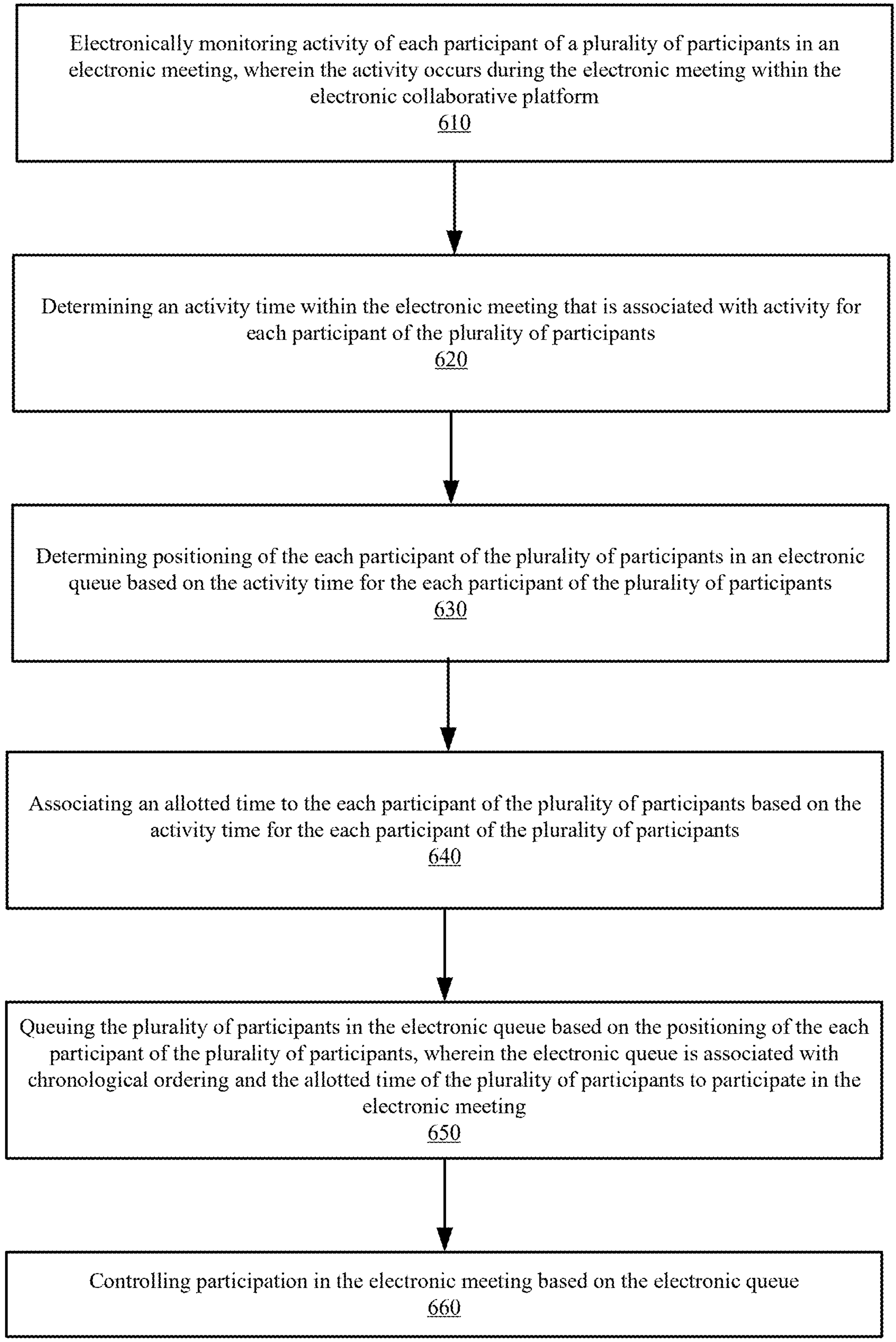
FIG. 6 is a flow chart illustrating an example of method flow for managing time and positioning of users attending an online collaborative environment using their respective account in accordance with some embodiments.

FIG. 6 is a flow chart illustrating an example of method flow for managing time and positioning of users attending an online collaborative environment using their respective account in accordance with some embodiments. At step 610, activity of each participant of a plurality of participants in an electronic meeting is electronically monitored, as described in FIGS. 1A-2B. The activity occurs during the electronic meeting, e.g., during the scheduled time, within the electronic collaborative platform 110, as described above. At step 620, an activity time within the electronic meeting that is associated with activity for each participant is determined, as described in FIGS. 1A-2B. At step 630, positioning of each participant of the plurality of participants is determined in an electronic queue where the positioning is based on the activity time for each participant, as described in FIGS. 1A-2B. At step 640, an allotted time is associated to each participant of the plurality of participants based on the activity time for each participant of the plurality of participants, as described in FIGS. 1A-2B. At step 650, the plurality of participants is queued in the electronic queue based on the positioning of each participant of the plurality of participants, as described in FIGS. 1A-2B. The electronic queue is associated with chronological ordering of the participants and their respective allotted time to participate in the electronic meeting, as described above in FIGS. 1A-2B. At step 660, participation in the electronic meeting is controlled based on the electronic queue, as described in FIGS. 1A-3C.

Figure 7:
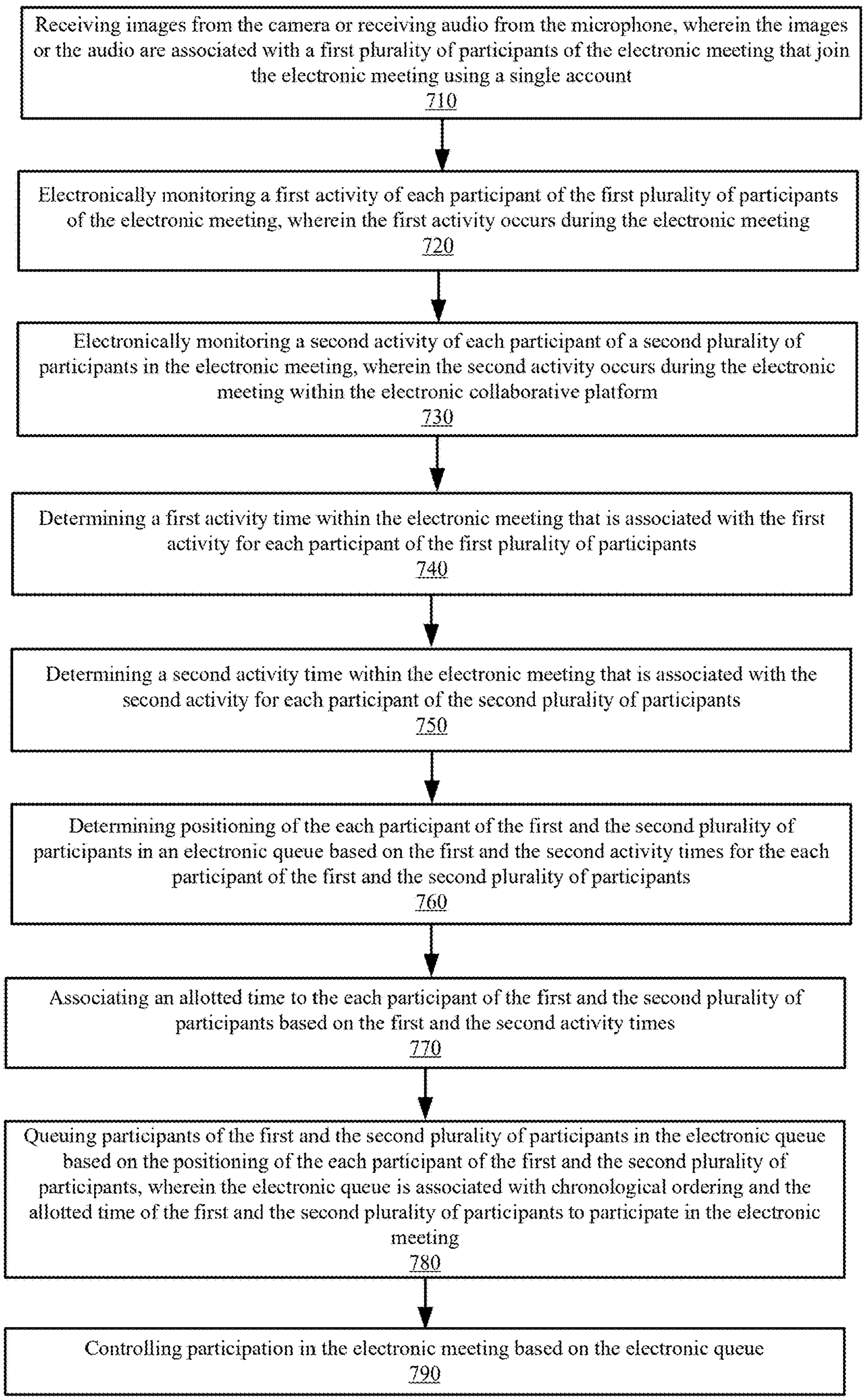
FIG. 7 is a flow chart illustrating an example of method flow for managing time and positioning of users attending an online collaborative environment using their respective account as well as two or more users attending the online collaborative environment using a single account in accordance with some embodiments.

FIG. 7 is a flow chart illustrating an example of method flow for managing time and positioning of users attending an online collaborative environment using their respective account as well as two or more users attending the online collaborative environment using a single account in accordance with some embodiments. At step 710, images are received from the camera or audio is received from the microphone, as described above in FIGS. 4A-4B. In some nonlimiting examples the images or the audio are associated with a first plurality of participants of the electronic meeting that join the electronic meeting using a single account, as described above in FIGS. 4A-4B. At step 720, a first activity of each participant of the first plurality of participants of the electronic meeting is electronically monitored, as described in FIGS. 4A-4B. For example, the first activity of a participant from the first plurality of participants may be their activity within the online collaborative environment such as chat, sharing a file, speaking such as asking/answering a question, etc., or may be external activity such as conversation regarding a particular topic with another participant, answering a phone call, composing or responding to an email outside of the online collaborative environment, etc. In one nonlimiting example, the first activity occurs during the electronic meeting. At step 730, a second activity of each participant of a second plurality of participants in the electronic meeting is electronically monitored, as described in FIGS. 4A-4B. In one nonlimiting example the second activity occurs during the electronic meeting within the electronic collaborative platform, as described above. In one example, the second activity of a participant from the second plurality of participants may be their activity within the online collaborative environment such as chat, sharing a file, speaking such as asking/answering a question, etc., or may be external activity such as conversation regarding a particular topic with another participant, answering a phone call, composing or responding to an email outside of the online collaborative environment, etc. At step 740, a first activity time within the electronic meeting that is associated with the first activity for each participant of the first plurality of participants is determined, as described in FIGS. 4A-4B. At step 750, a second activity time within the electronic meeting that is associated with the second activity for each participant of the second plurality of participants is determined, as described in FIGS. 4A-4B. At step 760, positioning of the each participant of the first and the second plurality of participants is determined in an electronic queue based on the first and the second activity times for the each participant of the first and the second plurality of participants, as described in FIGS. 4A-4B. At step 770, an allotted time is associated to the each participant of the first and the second plurality of participants based on the first and the second activity times, as described in FIGS. 4A-4B. At step 780, participants of the first and the second plurality of participants are queued in the electronic queue based on the positioning of the each participant of the first and the second plurality of participants, as described in FIGS. 4A-4B. The electronic queue is associated with chronological ordering and the allotted time of the first and the second plurality of participants to participate in the electronic meeting, as described above. At step 790, participation in the electronic meeting is controlled based on the electronic queue, as described above.

Figure 8:
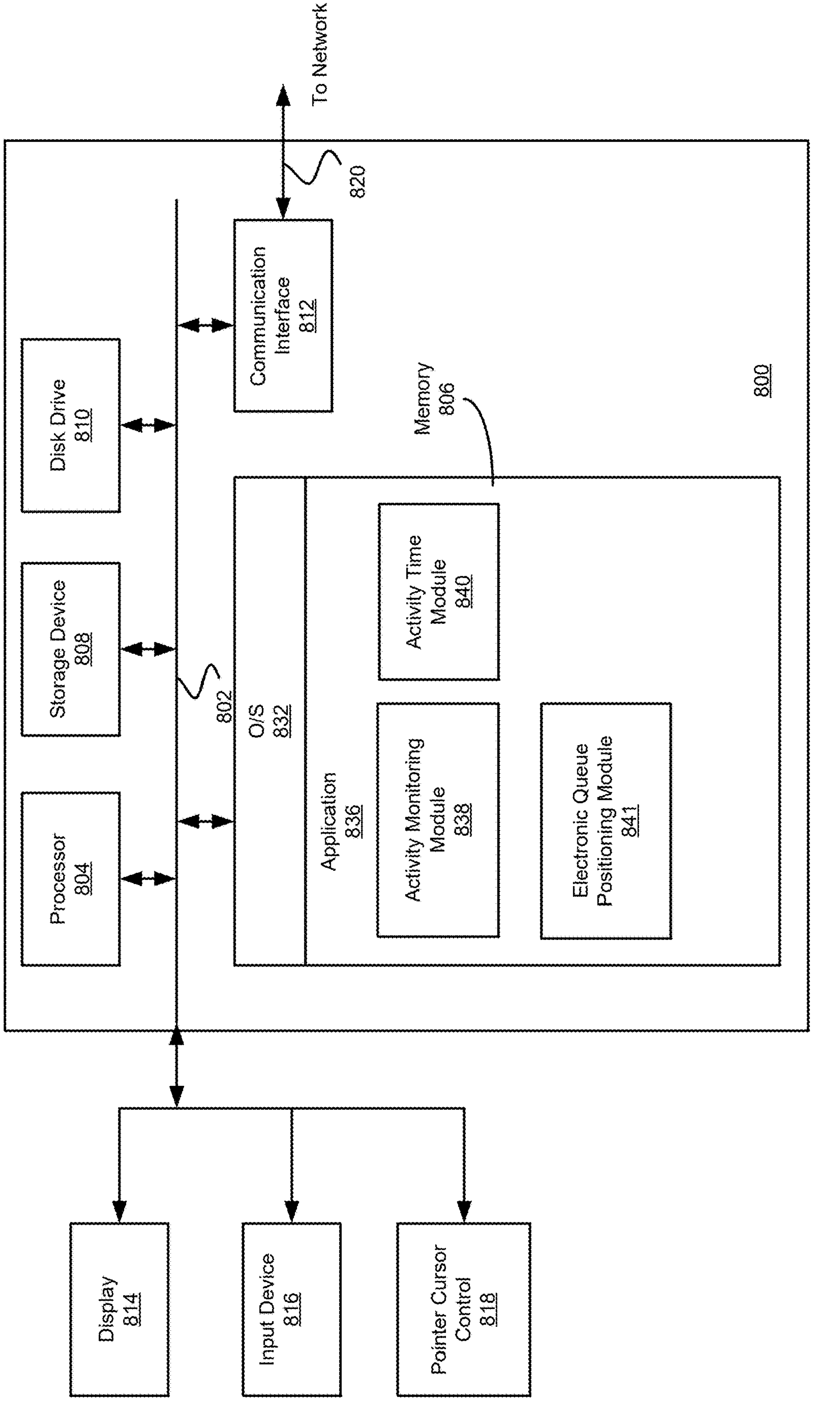
FIG. 8 is a block diagram depicting an example of computer system suitable for managing time and positioning of users in an online collaborative environment in accordance with some embodiments.

Referring now to FIG. 8, an exemplary block diagram of a computer system suitable for positioning users within an electronic collaborative platform in accordance with some embodiments is shown. In some examples, computer system 800 can be used to implement computer programs, applications, methods, processes, or other software to perform the above-described techniques and to realize the structures described herein. Computer system 800 includes a bus 802 or other communication mechanism for communicating information, which interconnects subsystems and devices, such as a processor 804, a system memory ("memory") 806, a storage device 808 (e.g., ROM), a disk drive 810 (e.g., magnetic or optical), a communication interface 812 (e.g., modem or Ethernet card), a display 814 (e.g., CRT or LCD), an input device 816 (e.g., keyboard), and a pointer cursor control 818 (e.g., mouse or trackball). In one embodiment, pointer cursor control 818 invokes one or more commands that, at least in part, modify the rules stored, for example in memory 806, to define the electronic message preview process.

According to some examples, computer system 800 performs specific operations in which processor 804 executes one or more sequences of one or more instructions stored in system memory 806. Such instructions can be read into system memory 806 from another computer readable medium, such as static storage device 808 or disk drive 810. In some examples, hard-wired circuitry can be used in place of or in combination with software instructions for implementation. In the example shown, system memory 806 includes modules of executable instructions for implementing an operating system ("OS") 832, an application 836 (e.g., a host, server, web services-based, distributed (i.e., enterprise) application programming interface ("API"), program, procedure or others). Further, application 836 includes a module of executable instructions for activity monitoring module 838 that monitors activities of the users, activity time module 840 to determine activity time associated with each activity of the users, and electronic queue positioning module 841 to determine the positioning of the users within the electronic queue based on the activity and activity time.

The term "computer readable medium" refers, at least in one embodiment, to any medium that participates in providing instructions to processor 804 for execution. Such a medium can take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 800. According to some examples, two or more computer systems 800 coupled by communication link 820 (e.g., LAN, PSTN, or wireless network) can perform the sequence of instructions in coordination with one another. Computer system 800 can transmit and receive messages, data, and instructions, including program code (i.e., application code) through communication link 820 and communication interface 812. Received program code can be executed by processor 804 as it is received, and/or stored in disk drive 810, or other non-volatile storage for later execution. In one embodiment, system 800 is implemented as a hand-held device. But in other embodiments, system 800 can be implemented as a personal computer (i.e., a desktop computer) or any other computing device. In at least one embodiment, any of the above-described delivery systems can be implemented as a single system 800 or can implemented in a distributed architecture including multiple systems 800.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A computer-implemented method for allotting time to meeting participants in an electronic collaborative platform, the method comprising:

electronically monitoring activities of each participant of a plurality of participants in an electronic meeting, wherein the activities occur during the electronic meeting within the electronic collaborative platform, and wherein the activities include a first activity and a second activity;

determining based on the monitoring of the first activity, for each participant of the plurality of participants, a first activity time within the electronic meeting that is associated with the first activity, wherein the first activity time comprises a predicted amount of time associated with the first activity for the participant;

determining based on the monitoring of the second activity, for each participant of the plurality of participants, a second activity time within the electronic meeting that is associated with the second activity, wherein the second activity time comprises a predicted amount of time associated with the second activity for the participant;

determining positioning of each participant of the plurality of participants in an electronic queue based on the first activity time for each participant of the plurality of participants and the second activity time for each participant of the plurality of participants;

associating an allotted time with each participant of the plurality of participants based on the first activity time for each participant of the plurality of participants and the second activity time for each participant of the plurality of participants;

queuing each participant of the plurality of participants in the electronic queue based on the determined positioning of each participant of the plurality of participants, wherein the electronic queue is associated with chronological ordering of each participant of the plurality of participants and the allotted time associated with each participant of the plurality of participants; and controlling participant interactions in the electronic meeting for each participant of the plurality of participants in the electronic queue in order of the chronological ordering of each participant of the plurality of participants and for durations based on the allotted time associated with each participant of the plurality of participants.

2. The computer-implemented method as described in claim 1, wherein the first activity and the second activity include one or more of exchanging electronic chat messages within the electronic collaborative platform, sharing a picture, sharing a document, sharing a video file, and sharing an audio file.

3. The computer-implemented method as described in claim 1, further comprising:

electronically monitoring external activities of the plurality of participants in the electronic meeting, wherein the external activities include activities that occur during the electronic meeting and are outside of the electronic collaborative platform, wherein the determining the first activity time is further based on the external activities.

4. The computer-implemented method as described in claim 3, wherein the external activities include one or more of exchange of electronic mail (e-mail), electronic chat messages external to the electronic collaborative platform, telephone call, and mobile text message.

5. The computer-implemented method as described in claim 1, wherein the determining the positioning of each participant of the plurality of participants is further based on a recency of the first activity and the second activity.

6. The computer-implemented method as described in claim 5, wherein the first activity is asking a question and the second activity is making a comment.

7. The computer-implemented method as described in claim 1, wherein the first activity time within the electronic meeting is at least one or more of a predicted amount of time a particular participant is interacting with another participant of the plurality of participants in the electronic meeting, and a predicted amount of time the particular participant is asking a question or a predicted amount of time associated with an answer to a question.

8. The computer-implemented method as described in claim 1 wherein the positioning of each participant of the plurality of participants in the electronic queue is further based on a ratio of an amount of time for a question and an answer to the question by a certain participant of the plurality of participants.

9. The computer-implemented method as described in claim 1, wherein associating the allotted time is further based on a duration that the electronic meeting is scheduled for.

10. A system for allotting time to meeting participants and queue management for the meeting participants in an electronic collaborative platform, comprising:

a processor;

a camera configured to capture images associated with participants of an electronic meeting;

a microphone configured to capture audio associated with participants of the electronic meeting; and a memory, storing a set of instructions, that when executed by the processor, causes:

receiving images from the camera or receiving audio from the microphone, wherein the images or the audio are associated with a first plurality of participants of the electronic meeting that join the electronic meeting using a single account;

electronically monitoring a first activity of each participant of the first plurality of participants of the electronic meeting, wherein the first activity occurs during the electronic meeting within the electronic collaborative platform;

electronically monitoring a second activity of each participant of a second plurality of participants in the electronic meeting, wherein the second activity occurs during the electronic meeting within the electronic collaborative platform;

determining, for each participant of the first plurality of participants, a first activity time within the electronic meeting that is associated with the first activity for each participant of the first plurality of participants, wherein the first activity time comprises a predicted amount of time associated with the first activity for the participant;

determining, for each participant of the second plurality of participants, a second activity time within the electronic meeting that is associated with the second activity, wherein the second activity time comprises a predicted amount of time associated with the second activity for the participant;

determining positioning of each participant of the first and the second plurality of participants in an electronic queue based on the first activity time for each participant of the plurality of first participants and the second activity time for each participant of the second plurality of participants;

associating an allotted time with each participant of the first and the second plurality of participants based on the first activity times and the second activity times;

queuing each participant of the first and the second plurality of participants in the electronic queue based on the positioning of each participant of the first and the second plurality of participants, wherein the electronic queue is associated with chronological ordering of each participant of the first and the second plurality of participants and the allotted time associated with each participant of the first and the second plurality of participants to participate in the electronic meeting; and controlling participant interaction in the electronic meeting for each participant of the first and the second plurality of participants in the electronic queue in order of the chronological ordering of each participant of the first and the second plurality of participants and for durations based on the allotted time associated with each participant of the first and the second plurality of participants.

11. The system as described in claim 10, wherein the electronically monitoring the first activity of the first plurality of participants of the electronic meeting further includes performing image recognition for distinguishing between participants of the first plurality of participants.

12. The system as described in claim 10, wherein the electronically monitoring the first activity of the first plurality of participants of the electronic meeting further includes performing voice recognition for distinguishing between participants of the first plurality of participants.

13. The system as described in claim 10, wherein determining positioning of each participant of the first plurality of participants in the electronic queue is further based on activity of the first plurality of participants that is unrelated to the electronic meeting.

14. The system as described in claim 10, wherein the second activity includes one or more of exchanging electronic chat messages within the electronic collaborative platform, sharing a picture, sharing a document, sharing a video file, and sharing an audio file.

15. The system as described in claim 10, further comprising:

electronically monitoring external activities of the first and the second plurality of participants in the electronic meeting, wherein the external activities include activities that occur during the electronic meeting and are outside of the electronic collaborative platform, wherein the determining the first activity time is further based on the external activities.

16. The system as described in claim 15, wherein the external activities include one or more of exchange of electronic mail (e-mail), electronic chat messages external to the electronic collaborative platform, telephone call, and mobile text message.

17. The system as described in claim 10, wherein the determining the positioning of each participant of the first and the second plurality of participants is further based on a recency of the first activity and the second activity.

18. The system as described in claim 17, wherein the first activity comprises asking a question and the second activity comprises making a comment.

19. The system as described in claim 10, wherein the first activity time within the electronic meeting is at least one or more of an amount of time a particular participant is interacting with another participant of the first or the second plurality of participants in the electronic meeting, and an amount of time the particular participant is asking a question or an amount of time associated with an answer to a question.

20. The system as described in claim 10, wherein the positioning of each participant of the first and the second plurality of participants in the electronic queue is further based on a ratio of an amount of time for a question and an answer to the question by a certain participant of the first and the second plurality of participants.

21. The system as described in claim 10, wherein associating the allotted time is further based on a duration that the electronic meeting is scheduled for.

22. A non-transitory, computer-readable medium storing a set of instructions that, when executed by a processor, cause:

electronically monitoring activities of each participant of a plurality of participants in an electronic meeting, wherein the activities occur during the electronic meeting within an electronic collaborative platform, and wherein the activities include a first activity and a second activity;

determining based on the monitoring of the first activity, for each participant of the plurality of participants, a first activity time within the electronic meeting that is associated with the first activity, wherein the first activity time comprises a predicted amount of time associated with the first activity for the participant;

determining based on the monitoring of the second activity, for each participant of the plurality of participants, a second activity time within the electronic meeting that is associated with the second activity, wherein the second activity time comprises a predicted amount of time associated with the second activity for the participant;

determining positioning of each participant of the plurality of participants in an electronic queue based on the first activity time for each participant of the plurality of participants and the second activity time for each participant of the plurality of participants;

associating an allotted time with each participant of the plurality of participants based on the first activity time for each participant of the plurality of participants and the second activity time for each participant of the plurality of participants;

queuing each participant of the plurality of participants in the electronic queue based on the determined positioning of each participant of the plurality of participants, wherein the electronic queue is associated with chronological ordering of each participant of the plurality of participants and the allotted time associated with each participant of the plurality of participants; and controlling participant interactions in the electronic meeting for each participant of the plurality of participants in the electronic queue in order of the chronological ordering of each participant of the plurality of participants and for durations based on the allotted time associated with each participant of the plurality of participants.

* * * * *